United States Patent
Fuller et al.

(10) Patent No.: US 8,475,971 B2
(45) Date of Patent: Jul. 2, 2013

(54) MEMBRANE TREATMENT METHOD

(75) Inventors: Timothy J. Fuller, Pittsford, NY (US); Beba T. Dobulis, Rochester, NY (US)

(73) Assignee: GM Global Technology Operations LLC, Detroit, MI (US)

(*) Notice: Subject to any disclaimer, the term of this patent is extended or adjusted under 35 U.S.C. 154(b) by 1062 days.

(21) Appl. No.: 10/997,475

(22) Filed: Nov. 24, 2004

(65) Prior Publication Data

US 2006/0110644 A1    May 25, 2006

(51) Int. Cl.
*H01M 8/10*    (2006.01)
*C08J 5/20*    (2006.01)

(52) U.S. Cl.
USPC ............... 429/494; 429/491; 521/27

(58) Field of Classification Search
USPC ............... 429/491–494; 521/27
See application file for complete search history.

(56) References Cited

U.S. PATENT DOCUMENTS 6,248,469 B1 * 6/2001 Formato et al. ............. 429/41
2002/0144944 A1   10/2002 Arcella et al.

FOREIGN PATENT DOCUMENTS

| DE | 112005002628 | 3/2009 |
| JP | 2004235051 | 8/2004 |
| WO | 0022684 | 4/2000 |
| WO | 03063266 | 7/2003 |
| WO | 2004006357 | 1/2004 |

* cited by examiner

*Primary Examiner* — Karie O'Neill Apicella
(74) *Attorney, Agent, or Firm* — BrooksGroup

(57) ABSTRACT

A method of enhancing electrical performance of a membrane for a fuel cell is disclosed. The method includes providing a perfluorosulfonic acid (PFSA) ionomer in an aqueous hydroxylated hydrocarbon aqueous solution. The PFSA dispersion or solution has an acid number the same or higher than an acid number of the membrane. The membrane is immersed in the solution such that the high acid number PFSA dispersion diffuses into the membrane. After immersion, the removed membrane is then dried under tension.

19 Claims, 1 Drawing Sheet

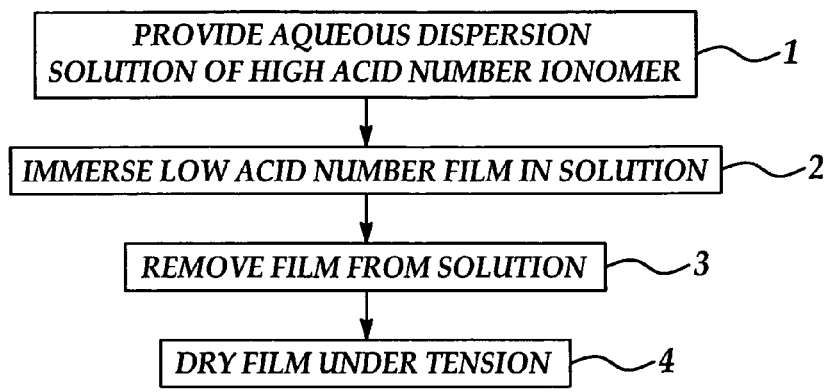
*Figure 1*
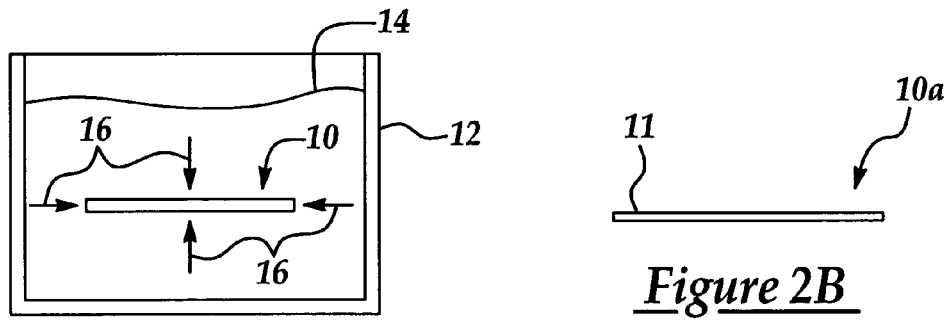
*Figure 2A*  *Figure 2B*
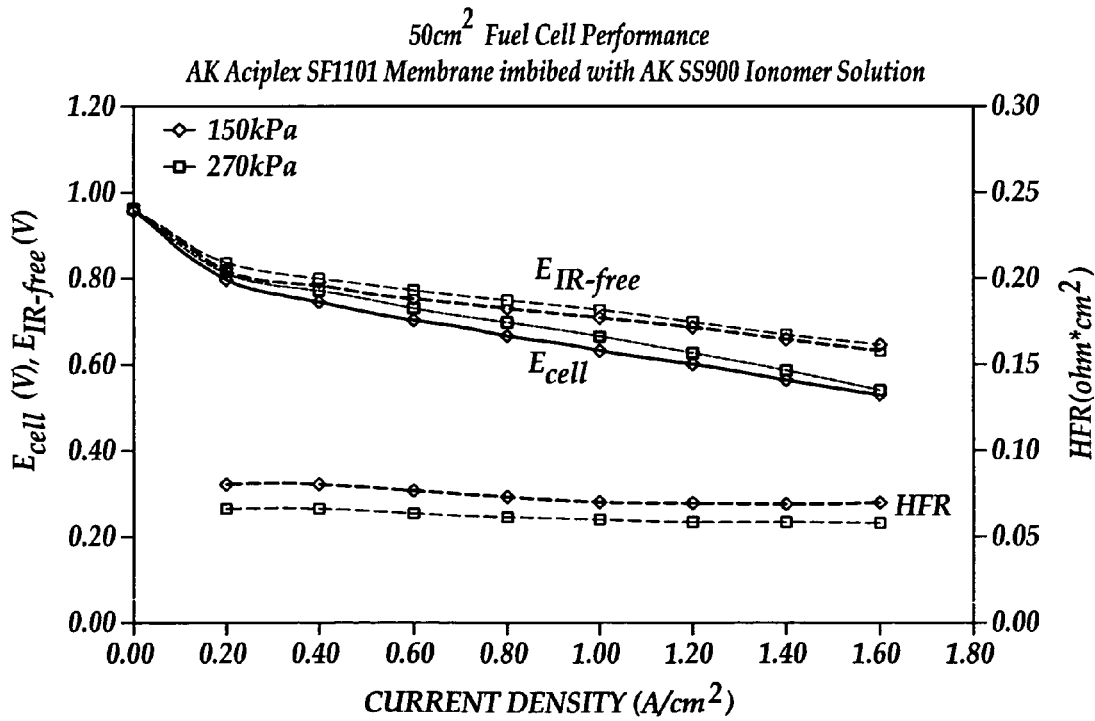
*Figure 3*

MEMBRANE TREATMENT METHOD

FIELD OF THE INVENTION

The present invention relates to fuel cells which generate electricity to power vehicles or other machinery. More particularly, the present invention relates to a method of treating a membrane such as a perfluorosulfonic acid membrane with, for example, a low equivalent weight perfluorosulfonic acid dispersion or solution, for use as a polyelectrolyte membrane (PEM) used in a fuel cell in order to enhance the proton-conducting capability of the membrane. The present invention also relates to treating a polyelectrolyte membrane with a perfluorosulfonic acid dispersion or solution, for use as a PEM in a fuel cell in order to produce thin membranes for improved water management, water vapor transfer, and reduced membrane electrical resistance. Moreover, the present invention allows for an improved membrane with reduced internal mechanical stresses and provides a means to reduce the electrical contact resistance between the (treated) membrane and the catalyst layer by allowing a better match between the ionomer in the membrane and the ionomer in the catalyst layer of a membrane electrode assembly.

BACKGROUND OF THE INVENTION

Fuel cell technology is a relatively recent development in the automotive industry. It has been found that fuel cell power plants are capable of achieving efficiencies as high as 55%. Furthermore, fuel cell power plants emit only heat and water as by-products.

Fuel cells include three components: a cathode, an anode and an electrolyte, which is sandwiched between the cathode and the anode and ideally passes only protons. Each electrode is coated on one side by with a catalyst. In operation, the catalyst on the anode splits hydrogen into electrons and protons. The electrons are distributed as electric current from the anode, through a drive motor and then to the cathode, whereas the protons migrate from the anode, through the electrolyte to the cathode. The catalyst on the cathode combines the protons with electrons returning from the drive motor and oxygen from the air to form water. Individual fuel cells can be stacked together in series to generate increasingly larger quantities of electricity.

In a Polymer-Electrolyte-Membrane (PEM) fuel cell, a polymer electrode membrane serves as the electrolyte between a cathode and an anode. The polymer electrode membrane currently being used in fuel cell applications requires a certain level of humidity to facilitate conductivity of the membrane. Therefore, maintaining the proper level of humidity in the membrane, through humidity/water management, is very important for the proper functioning of the fuel cell. Irreversible damage to the fuel cell will occur if the membrane dries out. Moreover, each proton that migrates through the polyelectrolyte membrane has a hydration sphere that in theory consists of at least four water molecules. The resultant electro-osmotic drag results in the drying out of the anode side of the membrane, especially as large numbers of hydrated protons move through the membrane. Because water is formed at the cathode side of the membrane, water molecules must diffuse back from the cathode side of the membrane to the anode side to sustain membrane hydration and to provide channels for vehicular proton transport. Thin membranes more easily remain uniformly hydrated compared with thicker membranes, because the back diffusion of water is more facile in thinner membranes. Moreover, with all else being equal, the electrical resistance of a thin membrane is less than that for of a thicker membrane. Furthermore, improved electrical resistance is also improved due to the ionomer treated membrane's ability to better provide a match to the ionomer in the catalyst layer. The catalyst layer often includes ionomer that is added during the catalyst preparation process to improve activity. Thus, improved electrical resistance in the ionomer treated membrane of the present invention is partly due to reduced dimensional thickness and is partly due to a reduced contact resistance between the ionomer treated membrane and the catalyst layer. The latter is a consequence of having treated the membrane film with an ionomer that better matches the ionomer in the catalyst layer.

In order to prevent leakage of the hydrogen fuel gas and oxygen gas supplied to the electrodes and prevent mixing of the gases, a gas-sealing material and gaskets are arranged on the periphery of the electrodes, with the polymer electrolyte membrane sandwiched there between. The sealing material and gaskets are assembled into a single part together with the electrodes and polymer electrolyte membrane to form a membrane and electrode assembly (MEA). Disposed outside of the MEA are conductive separator plates for mechanically securing the MEA and electrically connecting adjacent MEAs in series. A portion of the separator plate, which is disposed in contact with the MEA, is provided with a gas passage for supplying hydrogen fuel gas to the electrode surface (on the anode side) and removing generated water vapor (from the cathode side).

During fabrication of a fuel cell, the polymer electrolyte membrane of each MEA is produced in roll form under tension. The polymer electrolyte membrane has a high water uptake capability. Therefore, when wet, the membrane will expand in all three directions, although not proportionally. The membrane will shrink in all three dimensions upon subsequent drying.

Because the proton conductivity of PEM fuel cell membranes deteriorates rapidly as the membranes dry out, external humidification is required to maintain hydration of the membranes and sustain proper fuel cell functioning. Moreover, the presence of liquid water in automotive fuel cells is unavoidable because appreciable quantities of water are generated as a by-product of the electrochemical reactions during fuel cell operation. Furthermore, saturation of the fuel cell membranes with water can result from rapid changes in temperature, relative humidity, and operating and shutdown conditions. However, excessive membrane hydration results in flooding, excessive swelling of the membranes and the formation of differential pressure gradients across the fuel cell stack.

In order to maintain consistent fuel cell stack pressures, membranes are needed which swell uniformly and then only marginally in the presence of liquid water. Perfluorosulfonic acid (PFSA) membranes are typically used because of their advantaged oxidative, chemical and thermal stability and because of their superior proton conductivities at low relative humidity. PFSA membranes with a wide range of physical properties are available, and performance depends on the membrane's ion exchange capacity and the internal stresses and defects introduced during the membrane-film preparation process.

PFSA membranes with high acid numbers (or low equivalent weights) have enhanced proton conductivity at reduced relative humidity, but the mechanical properties of these membranes (especially with the high acid numbers) are compromised because of swelling due to high water uptake. The in-plane swelling of extruded membranes is further complicated because the membranes typically swell less in the machine process direction (the x-axis) as compared to the transverse direction (the y-axis) of the film. Non-uniform membrane swelling introduces the possibility of uneven, pressure-related stress failure mechanisms in fuel cell stacks.

Improved proton conducting membranes are required to meet cost and durability targets for polyelectrolyte membrane (PEM) fuel cells in automotive applications. Presently, PEM fuel cells operate at temperatures of up to about 95 degrees C., and external humidification is required to maintain membrane hydration. As the membranes dry out at reduced humidity, proton conductivity deteriorates rapidly. When fuel cells operate near the boiling point of water, elevated pressures are required to maintain membrane hydration, and the compressors required are a parasitic drain on the energy produced. PSFA membranes with high acid numbers (or low equivalent weights) are expected to have enhanced proton conductivity at reduced relative humidity, but the mechanical properties of these membranes (with the high acid numbers) are compromised because of increased water uptake and swelling. Cross-linking has been proposed to prevent the physical degradation of membranes with high acid numbers. However, methods are needed to perform the cross-linking reactions after the film is made; otherwise, film manufacture is difficult. The corporation W.L. Gore markets composite membranes made with low equivalent weight, PFSA ionomer. The structural strength of the membrane is maintained by reinforcing the ionomer with a porous expanded polytetrafluoroethylene matrix. Alternatively, a technique has been found to improve the performance of PFSA membranes with low acid numbers by imbibing, for example but not limited to, low equivalent weight ionomer into preformed high equivalent weight PFSA films. Moreover, the immersion (treatment) of a perfluorosulfonic acid film or other polyelectrolyte film with a dispersion (or solution) of perfluorosulfonic polymer causes the film to swell, and after removal and drying under tension, the modified membrane then becomes thinner (by about one-half) than that of the untreated film, and internal film stresses are reduced in the membrane film. The membrane film is found to have reduced electrical resistance compared with that of the untreated film. This improved electrical resistance is in part due to the thinner membrane and in part due to a better match of the catalyst layer (which often includes polyelectrolyte added during catalyst preparation) and the membrane.

SUMMARY OF THE INVENTION

The present invention is generally directed to a novel method of treating a membrane, such as a perfluorosulfonic acid (PFSA) membrane, with a low equivalent weight perfluorosulfonic acid dispersion (or solution) for use as a polyelectrolyte membrane (PEM) in a fuel cell. Immersion of the membrane in the low equivalent weight PFSA dispersion enhances the proton-conducting capability of the membrane during functioning of the fuel cell. The method includes providing, for example but not limiting to, a high acid number PSFA dispersed or dissolved in an aqueous hydroxylated-hydrocarbon aqueous solution, immersing a preformed low acid number PSFA, or other membrane, in the solution, and then, after removal, drying the membrane under tension. Between about 5 and 50 wt. % of the high acid number PFSA diffuses into the low acid number membrane, as calculated on the basis of the dry weight increase of the membrane. Compared with untreated low acid number ionomer membranes, the modified membranes show higher acid numbers and improved proton conductivity. Other advantages realized from the immersion treatment include the preparation of thin membrane films with reduced internal stresses, reduced and thus improved electrical resistance due to the smaller dimensional thickness, reduced and therefore improved electrical contact resistance between the treated membrane and the catalyst layer, and improved water diffusion for maintaining uniform membrane hydration.

BRIEF DESCRIPTION OF THE DRAWINGS

The invention will now be described, by way of example, with reference to the accompanying drawings, in which:

FIG. 1 is a flow diagram illustrating sequential process steps carried out according to the method of the present invention;

FIG. 2A is a schematic view illustrating immersion of a low acid number PFSA membrane into a dispersion (or solution) of a high acid number PFSA in an aqueous hydroxylated-hydrocarbon, according to the method of the present invention;

FIG. 2B is a schematic view of a PFSA membrane treated according to the method of the present invention; and FIG. 3 is a graph, which illustrates electrical performance characteristics of a fuel cell having a perfluorosulfonic acid membrane treated according to the method of the present invention.

DETAILED DESCRIPTION OF THE INVENTION

The present invention contemplates a method of improving the proton conductivity of a polyperfluorosulfonic acid (PFSA) or other membrane for a PEM fuel cell, which operates at a low relative humidity. According to the method, the acid number of a low acid number PSFA film or membrane, which typically has a relatively low acid number of 0.909 milliequivalents of sulfonic acid groups per gram of film (or 1100 equivalent weight), and preferably between 0.7 and 1.3 milliequivalents of sulfonic acid groups per gram of film, and most preferably between 0.9 and 1.25 milliequivalents of sulfonic acid groups per gram of film, is increased by immersing the preformed membrane in a relatively high acid number PFSA dispersed (or dissolved) in an aqueous hydroxylated-hydrocarbon. If hydrocarbon membranes are used, acid numbers of between 0.7 and 3.0 milliequivalents of sulfonic acid per gram of film are preferred dependent on the specific sulfonated hydrocarbon polymer structure used.

The high acid number PFSA dispersed in the hydroxylated-hydrocarbon, aqueous solution typically has an acid number of between 0.9 and 1.6 milliequivalents of sulfonic acid groups per gram of resin solids, and more preferably between 1 and 1.5 milliequivalents of sulfonic acid groups per gram of polymer solids, and most preferably between 1.25 and 1.45 milliequivalents of sulfonic acid groups per gram of polymer solids. Examples of hydroxylated hydrocarbons which are suitable for implementation of the present invention include methanol, ethanol, 1-propanol, 2-propanol, 1-butanol, 2-butanol, tertiary-butanol, etc., and mixtures thereof, either alone or with water.

During immersion, the membrane swells and is then, after removal from the immersion fluid, dried under tension to prevent the membrane from wrinkling and contracting in size. After drying under tension, the membrane has a thickness, which is typically about one-half the thickness of the original membrane. As calculated on the basis of the dry weight increase of the film, between typically about 5 and 50 wt. % of the high acid number PFSA diffuses into the low acid number PFSA film. The low acid number PFSA film serves as a support for the high acid number PFSA proton-conducting material. Compared with the untreated low acid number ionomer membranes, the modified PFSA membranes show higher acid numbers and improved proton conductivity. The resulting composite membranes have enhanced physical property strengths compared to membranes made with the high acid number alone. The low acid number ionomer serves as a structural polymeric support for the high acid number ionomer in the membrane. The scope of the invention includes the preparation of composite membranes made with hydrocarbon ionomers, PFSA ionomers and blends of hydrocarbon and PFSA ionomers, along with the corresponding ionomer films. The composite membranes are transparent (provided the untreated films are transparent) and appear to be homogenous.

If thin membranes with a uniform composition are required, the PFSA membrane film can be immersed in a solution or dispersion of PFSA polymer having the same acid number as the polymer film. After immersion, the swollen film is removed form the dispersion (or solution), and dried under tension to obtain a membrane film of about half the thickness of the untreated film. We allude to the PFSA polymer in aqueous alcohols as a dispersion, or as a solution, because there is some conjecture that the PFSA is actually dispersed in the aqueous hydroxylated hydrocarbon as micelles rather than dissolved as a true solution of the macromolecules dissolve in a solvent. Advantages to a thin membrane include improved water management, reduced membrane electrical resistance, reduced internal mechanical stresses within the resistance, and reduced electrical contact resistance between the (treated) membrane and the catalyst layer. Advantages to immersing a low acid number membrane film into a high acid number dispersion include all of the above advantages plus an additional advantage of improved proton conductivity in the treated membrane.

FIG. 1 illustrates sequential process steps carried out according to the present invention. In step 1, an aqueous dispersion solution of high acid number ionomer polyperfluorosulfonic acid (PFSA) is initially provided. Hypothetically, a perfluorosulfonic acid monomer or oligomer along with an appropriate initiator could be imbibed into the membrane film, which then can be polymerized within the membrane. In the present invention, a preformed ionomer in an aqueous hydroxylated hydrocarbon is provided. High acid number PFSA polymers preferably have between between 0.9 and 1.6 milliequivalents of sulfonic acid groups per gram of resin solids, and more preferably between 1 and 1.5 milliequivalents of sulfonic acid groups per gram of polymer solids, and most preferably between 1.25 and 1.45 milliequivalents of sulfonic acid groups per gram of polymer solids. The solution includes the PFSA ionomer in an aqueous solution of hydroxylated hydrocarbon including methanol, ethanol, 1-propanol, 2-propanol, 1-butanol, 2-butanol, tertiary-butanol, etc., either alone or as mixtures thereof, with water. In step 2, a low acid number membrane film is immersed in the ionomer dispersion or solution. The low acid number membrane may be a low acid number perfluorosulfonic acid (PFSA) membrane film or a composite membrane film made with hydrocarbon ionomers, PFSA ionomers and blends of hydrocarbon and PFSA ionomers, along with the corresponding ionomer films. The preferred low acid number PFSA membrane film has an acid number between 0.909 milliequivalents of sulfonic acid groups per gram of film (or 1100 equivalent weight), and preferably between 0.7 and 1.3 milliequivalents of sulfonic acid groups per gram of film, and most preferably between 0.9 and 1.25 milliequivalents of sulfonic acid groups per gram of film. If hydrocarbon membranes are used, acid numbers of between 0.7 and 3.0 milliequivalents of sulfonic acid per gram of film are preferred dependent on the specific sulfonated hydrocarbon polymer structure used. In step 3, the swollen membrane film is removed from the dispersion or solution. In step 4, the membrane is dried under tension, according to techniques, which are known to those skilled in the art, such as a tenter frame, to maintain film thickness. Without drying under tension, the swollen membrane shrinks markedly and becomes wrinkled.

The membrane film immersion step is shown schematically in FIG. 2A. Accordingly, a container 12 is provided having a high acid number PFSA ionomer 16 in an aqueous hydroxylated hydrocarbon 14. A low acid number PFSA membrane film 10 is immersed in the solution 14, during which time the high acid number PFSA ionomer 16 diffuses into the PFSA membrane 10. The PFSA membrane 10 is then removed from the solution 14 and dried under tension. This results in a high acid number PFSA membrane 10a having a membrane body 11, the thickness which is typically about half the thickness of the original low acid number PFSA membrane 10, as shown in FIG. 2B. The membrane body 11 of the high acid number PFSA membrane 10a includes between typically about 5 and about 50 weight percent of the high acid number PFSA ionomer 16, and more typically between 5 and 20 weight percent of the high acid number ionomer.

The film treatment method of steps 1-4 increases the number of sulfonic acid groups in the membrane according to the weight fraction of components in the membrane. Moreover, the method increases the proton conductivity of the membrane. The method is useful to modify the conductivity of commercially-available PFSA polymers and membranes. The improved conductivity and enhanced physical properties of the treated membranes are expected to improve fuel cell performance at low relative humidity and elevated temperatures. Moreover, the thin, modified membranes allow for low catalyst electrical contact resistance and for low membrane resistance due to the decreased membrane thickness, an improved match of ionomers in the modified membrane with catalyst, and improved water back diffusion from the cathode side to the anode side of the membrane during fuel cell use.

The invention will be further understood by consideration of the following examples.

Example I

An Aciplex membrane film (1101) and an aqueous dispersion or solution (SS900/05) were obtained from Asahi-Kasei. The membrane film was immersed in the aqueous dispersion solution, then removed from the solution and dried under tension. The membrane film increased in weight by 15.4% after drying. The overall amount of ionomer from the SS900/05 dispersion solution in the membrane film was 15.4 wt. %. The treated membrane film was about one-half the thickness of the pre-treated membrane film.

Example II

An Aciplex membrane film (1101) and an aqueous dispersion solution (SS-700) were obtained from Asahi-Kasei. The membrane film was immersed in the aqueous dispersion or solution, removed from the solution and dried under tension, respectively. The membrane film increased in weight by 13.3% after drying for 16 hours at between 150 and 170 degrees C. If lower temperatures are used, the SS-700 component re-dissolves in water. The overall amount of 700 equivalent weight ionomer from the SS-700 dispersion solution in the membrane film was 13.3 wt. %. The treated membrane film was about one-half the thickness of the pre-treated membrane film.

Tables (I) and (II) below present, in tabulated form, electrical performance data for fuel cells which incorporate the treated PFSA membrane films of the present invention as the polymer electrolyte membrane (PEM) in the fuel cells.

TABLE I

High Pressure Performance (270 kPa$_{abs}$)

| i(A/cm$^2$) | $E_{cell}$(V) | sd_Ecell | HFR (ohm*cm$^2$) | sd_HFR | $E_{iR\text{-}free}$(V) | sd_$E_{iR\text{-}free}$ |
|---|---|---|---|---|---|---|
| 0.0002 | 0.9955 | 0.0028 | 0.0048 | 0.0027 | 0.9955 | 0.0028 |
| 0.0216 | 0.8774 | 0.0040 | 0.1398 | 0.0816 | 0.8804 | 0.0024 |
| 0.0416 | 0.8541 | 0.0012 | 0.1004 | 0.0079 | 0.8583 | 0.0012 |
| 0.0820 | 0.8274 | 0.0004 | 0.0892 | 0.0061 | 0.8347 | 0.0008 |
| 0.1216 | 0.8079 | 0.0009 | 0.0828 | 0.0052 | 0.8179 | 0.0014 |
| 0.2014 | 0.7816 | 0.0005 | 0.0716 | 0.0056 | 0.7960 | 0.0009 |
| 0.4012 | 0.7386 | 0.0008 | 0.0710 | 0.0011 | 0.7671 | 0.0011 |
| 0.8010 | 0.6789 | 0.0023 | 0.0670 | 0.0033 | 0.7326 | 0.0024 |
| 1.0008 | 0.6476 | 0.0029 | 0.0683 | 0.0026 | 0.7160 | 0.0010 |
| 1.2006 | 0.6230 | 0.0014 | 0.0635 | 0.0064 | 0.6993 | 0.0077 |
| 1.5006 | 0.5816 | 0.0008 | 0.0672 | 0.0004 | 0.6824 | 0.0009 |

TABLE II

Low Pressure Performance (150 kPa$_{abs}$)

| i(A/cm$^2$) | $E_{cell}$(V) | sd_Ecell | HFR (ohm*cm$^2$) | sd_HFR | $E_{iR\text{-}free}$(V) | sd_$E_{iR\text{-}free}$ |
|---|---|---|---|---|---|---|
| 0.0002 | 0.9786 | 0.0019 | 0.0051 | 0.0020 | 0.9787 | 0.0019 |
| 0.0216 | 0.9033 | 0.0028 | 0.1280 | 0.0498 | 0.9061 | 0.0026 |
| 0.0416 | 0.8810 | 0.0007 | 0.1007 | 0.0124 | 0.8852 | 0.0012 |
| 0.0820 | 0.8545 | 0.0020 | 0.1044 | 0.0123 | 0.8631 | 0.0012 |
| 0.1216 | 0.8394 | 0.0008 | 0.0620 | 0.0017 | 0.8469 | 0.0007 |
| 0.2014 | 0.8103 | 0.0012 | 0.0716 | 0.0030 | 0.8247 | 0.0014 |
| 0.4012 | 0.7679 | 0.0055 | 0.0695 | 0.0089 | 0.7958 | 0.0026 |
| 0.8010 | 0.7074 | 0.0047 | 0.0592 | 0.0034 | 0.7548 | 0.0022 |
| 1.0008 | 0.6812 | 0.0065 | 0.0518 | 0.0030 | 0.7330 | 0.0047 |
| 1.2006 | 0.6409 | 0.0044 | 0.0496 | 0.0013 | 0.7004 | 0.0050 |
| 1.5006 | 0.5728 | 0.0078 | 0.0485 | 0.0003 | 0.6456 | 0.0082 |

Table I is a summary of 50-cm$^2$, fuel cell data obtained with a membrane SK-1101 that was modified by immersion in 900 equivalent weight (1.11 milliequivalents of sulfonic acid groups per gram of resin solids), as a 5-weight percent solids dispersed in mixed alcohols with water. The current density labeled "i" (in A/cm$^2$) was applied at a pressure of 7 and 25 psi gauge with a stoichiometry of 2 moles of hydrogen to 2 moles of air and the resulting cell voltage, E (in volts) was measured. The electrical resistance of the cell as a function of current density is reported as the term HFR, which is the high frequency resistance after an applied alternating current perturbation at 1 kilo-Hertz. The cell resistance is the sum of the proton-conduction resistance in the membrane and the various electronic resistances including bulk and contact resistances. Thus, the HFR relates to the resistances of the electrode with catalyst, diffusion media and the membrane. Adding the HFR*i to the cell voltage, E, allows a determination of the maximum theoretical cell voltage output of the cell and is reported as $E_{iRfree}$. An advantage of the film treatment described is a better match of the treated membrane to the PFSA in the catalyst layer. This is especially beneficial when catalyst coated diffusion media is prepared with a lower equivalent weight ionomer than the one used in the membrane. The membrane treatment described herein allows for better adhesion of the membrane to the catalyst layer as well. This impacts the HFR by lowering the experimentally measured value. The term "sd" in the table refers to standard deviation.

FIG. 3 presents, in graphic form, electrical performance data for fuel cells, which incorporate the treated PFSA membrane films of the present invention as the polymer electrolyte membrane (PEM) in the fuel cells. An additional advantage of the film treatment is a better match between the membrane and the PFSA ionomer in the catalyst layer. This is especially beneficial when catalyst coated diffusion media is treated with a different ionomer than the one used in the membrane. The treatment allows for better adhesion of the membrane to the catalyst layer and reduces the contact resistance between the membrane and the catalyst layer.

While the preferred embodiments of the invention have been described above, it will be recognized and understood that various modifications can be made in the invention and the appended claims are intended to cover all such modifications which may fall within the spirit and scope of the invention.

What is claimed is:

1. A method of enhancing electrical performance of a polymer electrolyte membrane for a fuel cell, comprising:
   providing a preformed perfluorosulfonic acid membrane having a first dry weight and having a first acid number that defines an equivalent weight of sulfonic acid groups in said perfluorosulfonic acid membrane;
   providing an aqueous solution comprising a perfluorosulfonic acid ionomer dispersed or dissolved in an aqueous hydroxylated-hydrocarbon, said perfluorosulfonic acid ionomer having a second acid number that defines an equivalent weight of sulfonic acid groups in said perfluorosulfonic acid ionomer, said second acid number of said perfluorosulfonic acid ionomer being at least as high as said first acid number of said perfluorosulfonic acid membrane;
   immersing said preformed perfluorosulfonic acid membrane having said first dry weight in said aqueous solution so that said perfluorosulfonic acid ionomer dispersed or dissolved in said aqueous hydroxylated-hydrocarbon diffuses into said perfluorosulfonic acid membrane, said preformed perfluorosulfonic acid membrane swelling during said immersion;

removing said perfluorosulfonic acid membrane from said aqueous solution; and drying said perfluorosulfonic acid membrane under tension to provide an enhanced perfluorosulfonic acid membrane comprising a second dry weight higher than said first dry weight and that is thinner than said preformed perfluorosulfonic acid membrane.

2. The method of claim 1 wherein said hydroxylated hydrocarbon comprises at least one of methanol, ethanol, 1-propanol, 2-propanol, 1-butanol, 2-butanol, tertiary-butanol, mixtures thereof, and mixtures thereof with water.

3. The method of claim 1 wherein said second acid number of said perfluorosulfonic acid ionomer is in the range of between about 0.9 and about 1.6 millequivalents of sulfonic acid groups per gram of perfluorosulfonic acid ionomer.

4. The method of claim 1 wherein said first acid number of said preformed perfluorosulfonic acid membrane, before being immersed in said aqueous solution, is in a range of between about 0.7 and about 1.3 milliequivalents of sulfonic acid per gram of membrane.

5. The method of claim 1 wherein said preformed perfluorosulfonic acid membrane, before being immersed in said aqueous solution, is a composite membrane comprising hydrocarbon ionomers wherein said membrane has an acid number between 1 and 3 milliequivalents of sulfonic acid groups per gram of ionomer.

6. The method of claim 1 wherein said preformed perfluorosulfonic acid membrane, before being immersed in said aqueous solution, is a composite membrane comprising perfluorosulfonic acid ionomers.

7. The method of claim 1 wherein said preformed perfluorosulfonic acid membrane, before being immersed in said aqueous solution, is a composite membrane comprising a blend of hydrocarbon and perfluorosulfonic acid ionomers.

8. The method of claim 1 wherein said preformed perfluorosulfonic acid membrane, before being immersed in said aqueous solution, is a composite membrane comprising hydrocarbon ionomer and perfluorosulfonic acid ionomer films.

9. A method of enhancing electrical performance of a polymer electrolyte membrane for a fuel cell, comprising:

providing a preformed perfluorosulfonic acid membrane having a dry weight and having a first acid number that defines an equivalent weight of sulfonic acid groups in said perfluorosulfonic acid membrane;

imbibing from about 5 to about 50 weight percent of a perfluorosulfonic acid ionomer having said dry weight into said preformed perfluorosulfonic acid membrane, wherein said weight percent is calculated on the basis of the dry weight increase of said preformed perfluorosulfonic acid membrane, said perfluorosulfonic acid ionomer having a second acid number that defines an equivalent weight of sulfonic acid groups in said perfluorosulfonic acid ionomer, and said second acid number of said perfluorosulfonic acid ionomer being higher than said first acid number of said perfluorosulfonic acid membrane; and drying said perfluorosulfonic acid membrane under tension to provide an enhanced perfluorosulfonic acid membrane that is thinner than said preformed perfluorosulfonic acid membrane.

10. The method of claim 9 wherein said hydroxylated hydrocarbon comprises at least one of methanol, ethanol, 1-propanol, 2-propanol, 1-butanol, 2-butanol, tertiary-butanol, mixtures thereof, and mixtures thereof with water.

11. The method of claim 9 wherein said second acid number of said perfluorosulfonic acid ionomer is in the range of between about 0.9 to about 1.6 milliequivalents of sulfonic acid groups per gram of perfluorosulfonic acid ionomer.

12. The method of claim 9 wherein said first acid number of said preformed perfluorosulfonic acid membrane, before being immersed in said aqueous solution, is in a range of between about 0.7 and about 1.3 milliequivalents of sulfonic acid per gram of membrane.

13. The method of claim 9 wherein said preformed perfluorosulfonic acid membrane, before being immersed in said aqueous solution, is a composite membrane comprising hydrocarbon ionomers comprising at least one of carbon, hydrogen, and potentially oxygen, nitrogen, phosphorus, silicon, and sulfur.

14. The method of claim 9 wherein said preformed perfluorosulfonic acid membrane, before being immersed in said aqueous solution, is a composite membrane comprising perfluorosulfonic acid ionomers.

15. The method of claim 9 wherein said preformed perfluorosulfonic acid membrane, before being immersed in said aqueous solution, is a composite membrane comprising a blend of hydrocarbon and perfluorosulfonic acid ionomers.

16. The method of claim 9 wherein said preformed perfluorosulfonic acid membrane, before being immersed in said aqueous solution, is a composite membrane comprising hydrocarbon ionomer and perfluorosulfonic acid ionomer films.

17. The method of claim 9 comprising imbibing from about 5 to about 20 weight percent of said perfluorosulfonic acid ionomer into said preformed perfluorosulfonic acid membrane by immersing said preformed perfluorosulfonic acid membrane in an aqueous solution comprising the perfluorosulfonic acid ionomer and a hydroxylated-hydrocarbon, wherein said weight percent is calculated on the basis of the dry weight increase of said membrane.

18. A method of enhancing electrical performance of a polymer electrolyte membrane for a fuel cell, comprising:

providing a preformed perfluorosulfonic acid membrane having a first dry weight and having a first acid number that defines an equivalent weight of sulfonic acid groups in said perfluorosulfonic acid membrane;

providing an aqueous solution comprising a perfluorosulfonic acid ionomer dispersed or dissolved in an aqueous hydroxylated-hydrocarbon, said perfluorosulfonic acid ionomer having a second acid number that defines an equivalent weight of sulfonic acid groups in said perfluorosulfonic acid ionomer, said second acid number of said perfluorosulfonic acid ionomer being at least as high as said first acid number of said perfluorosulfonic acid membrane;

immersing said preformed perfluorosulfonic acid membrane having said first dry weight in said aqueous solution so that said perfluorosulfonic acid ionomer dispersed or dissolved in said aqueous hydroxylated-hydrocarbon diffuses into said perfluorosulfonic acid membrane, said preformed perfluorosulfonic acid membrane swelling during said immersion;

removing said perfluorosulfonic acid membrane from said aqueous solution; and drying said perfluorosulfonic acid membrane under tension to provide an enhanced perfluorosulfonic acid membrane comprising a second dry weight higher than said first dry weight and that is one half the thickness of said preformed perfluorosulfonic acid membrane.

19. A method of enhancing electrical performance of a polymer electrolyte membrane for a fuel cell, comprising:
  providing a preformed perfluorosulfonic acid membrane having a dry weight and having a first acid number that defines an equivalent weight of sulfonic acid groups in said perfluorosulfonic acid membrane;
  imbibing from about 5 to about 50 weight percent of a perfluorosulfonic acid ionomer having said dry weight into said preformed perfluorosulfonic acid membrane, wherein said weight percent is calculated on the basis of the dry weight increase of said preformed perfluorosulfonic acid membrane, said perfluorosulfonic acid ionomer having a second acid number that defines an equivalent weight of sulfonic acid groups in said perfluorosulfonic acid ionomer, and said second acid number of said perfluorosulfonic acid ionomer being higher than said first acid number of said perfluorosulfonic acid membrane; and
  drying said perfluorosulfonic acid membrane under tension to provide an enhanced perfluorosulfonic acid membrane that is one half the thickness of said preformed perfluorosulfonic acid membrane.

* * * * *